June 16, 1964    J. D. BOSTROM    3,137,111
SEALING APPARATUS
Filed April 2, 1962
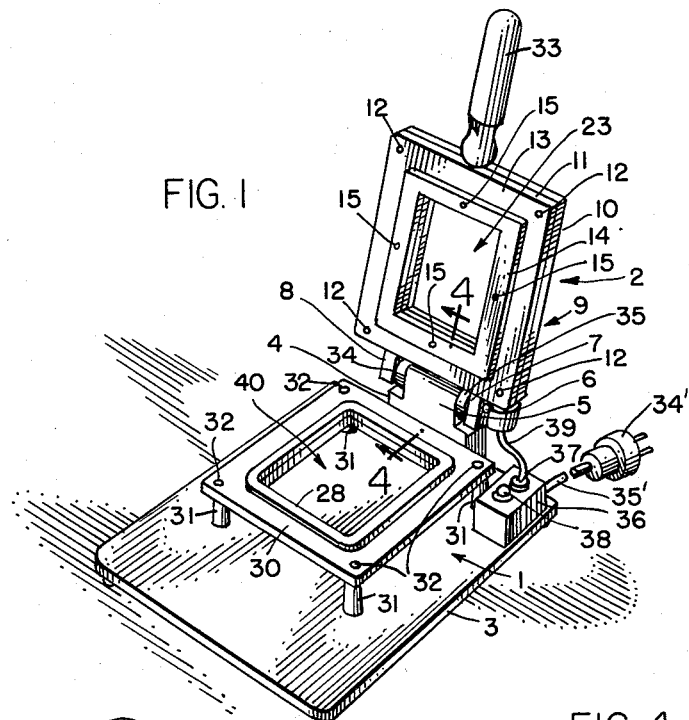
INVENTOR:
JOHN DONALD BOSTROM
BY
Marshall, Johnston, Cook & Root
ATT'YS 3,137,111
SEALING APPARATUS
John Donald Bostrom, Niles, Ill., assignor to Poster Packaging, Inc., Chicago, Ill., a corporation of Delaware
Filed Apr. 2, 1962, Ser. No. 184,445
7 Claims. (Cl. 53—373)

This invention relates to a sealing apparatus and to a method of sealing and is more particularly concerned with a sealing device for sealing a heat sealable lid to the free edge of a laterally extending, heat shrinkable plastic flange formed on the wall of a container body.

It is well known to make containers out of self-sustaining, relatively rigid plastic materials, such as, for example, oriented polystyrene. This type of material is readily distorted but will normally tend to return to its original position due to its inherent resiliency. However, plastic materials, such as oriented polystyrene, have one very unusual characteristic. When exposed to very high temperatures such as are used in conventional heat sealing, these materials tend to shrink or crumple. It has been quite a problem, therefore, to find a suitable way for sealing a lid or closure to a container made from such materials.

One of the objects of the present invention is to provide a new and improved sealing apparatus which can be used to seal a heat sealable lid to the free edge of a laterally extending, heat shrinkable plastic flange formed on the wall of a container body.

Another object of the invention is to provide an apparatus of the type described which is suitable for sealing a lid or closure made from oriented polystyrene to the flange of a container body also made from oriented polystyrene.

A further object of the invention is to provide a new and improved method for sealing together two plastic materials, at least one of which is a heat shrinkable plastic material.

Other objects and advantages will be apparent from the following description in conjunction wtih the accompanying drawings in which FIGURE 1 is a perspective view of one embodiment of a sealing apparatus made in accordance with this invention;

FIGURE 2 is a perspective view showing respectively a lid or closure and a container body of the type adapted to be sealed together in the apparatus shown in FIGURE 1;

FIGURE 3 is a perspective view of a lid or closure and container as shown in FIGURE 2 after they have been sealed together in the apparatus shown in FIGURE 1;

FIGURE 4 is an enlarged partial sectional view taken along the line 4—4 of FIGURE 1 after the apparatus shown in FIGURE 1 is partially closed and about to be used to effect a sealing between the lid or closure and the container body of FIGURE 2; and FIGURE 5 is a partial sectional view with parts broken away of a rim of the container shown in FIGURE 3 illustrating generally the manner in which the marginal edge of the lid and the marginal edge of the flange are sealed together.

As will be seen from the drawings, the invention provides a sealing device for sealing a heat sealable lid or closure to the free edge of a laterally extending, heat shrinkable plastic flange formed on the wall of a container body comprising: (a) supporting means for supporting said flange; (b) a heating element having a heating surface adapted to heat said lid adjacent the free edge of said flange when said lid is brought into contact with said flange, and (c) means to hold the portion of said flange remote from the heated portion in contact with (a), said last named means including heat insulating means adapted to heat insulate said portion of said flange remote from the heated portion. As hereinafter described the supporting means (a) is preferably resilient. The heating surface of (b) is preferably coated with a material which does not stick or adhere to the lid or closure. This anti-sticking material is preferably a polymer of tetrafluoroethylene (e.g., Teflon). An important feature of the invention is the provision of a vertically extending air space between the heating or sealing surface of the heating element and a nonheat conducting member which holds the portion of the flange of the container body remote from the heated portion during the sealing operation. This air space, coupled with the non-heat conducting member, makes it possible to seal the free edge of the flange of the container to a closure or lid without heat shrinking the side walls or body of the container.

In practicing the method of the invention the supporting means for supporting the flange of the container need not be cooperatively associated with the heating element but it is preferable to have these two members cooperatively associated with one another, preferably by pivoting one with respect to the other. This makes it possible to apply the heating element to the article to be sealed in a precise location so that the heat sealing occurs at the free edge of the lid and flange and the portion of the flange removed therefrom is heat insulated. It is further desirable in the practice of the invention that the means (c) referred to above project below the heating surface of (b) so that the means (c) contacts the lid or closure during the sealing operation before (b) when (b) and (c) are superimposed on a lid applied to the flange of a container supported by (a).

In the drawings, FIGURE 1 illustrates one embodiment of the sealing apparatus in which the supporting means for supporting a container by an outwardly extending flange is generally shown at 1 and the sealing means is generally shown at 2. The supporting means 1 is mounted on a suitable base 3 so that the unit is operable. A hinge block 4 is welded, or otherwise fastened, to the rear end of the base 3 and is provided with an upwardly extending portion 5 having a hole therethrough, not shown, which is adapted to receive a shaft or pin 6. The latter extends through the members 7 and 8 which are welded, or otherwise fastened, to the lower part or rear of the housing 9 which is a part of the heating element.

The housing 9 consists of an upper member 10 which has the appearance of a rectangular frame with a rectangular centrally located opening. The member 10 is connected to a heating member 11 by means of screws, or other fastening means 12. The heating member 11 has a heating surface 13 and substantially coincides with the member 12.

A heat insulating member 14 is fastened to the inner part of the member 11 by screws 15 or in any other suitable manner. The member 14 as shown in FIGURE 4 also has the appearance of a rectangular frame and consists of two heat insulating elements 16 and 17, preferably made from asbestos or other heat insulating material. In the embodiment shown, aluminum foil 18 is placed between the member 11 and the member 16 and aluminum foil 19 is placed between the members 16 and 17 to assist in the heat insulation. A vertically extending air space 20 is provided between the outer ends of the members 16 and 17 and the downwardly projecting portion 21 of the member 11. It will be understood that this air space extends entirely around the members 16 and 17. A coating of plastic 22 is applied to the bottom of the projecting portion 21 and forms a part of the heating surface. This coating 22, as previously indicated, is preferably formed from a material which will not stick to the upper part of the lid or closure during the sealing operation. One material which has proved very advantageous for this purpose is a polymer of tetrafluoroethylene (e.g., Teflon). The entire assembly of elements 10, 11, 16 and 17 provides an opening 23 which permits air to circulate to the top of the lid or closure and thereby assists in heat insulating the inner part of the container during the heat sealing operation. It will be seen that the bottom surface 24 of the element 17 projects slightly below the bottom of the surface 22 so that the surface 24 tends to contact and grip the lid or closure 25 and hold it in place against the flange 26 formed on the upper part of the container 27. As pressure is exerted downwardly on the element 2, the outer part of the surface 24 presses against a portion of the lid 25 and holds this portion of the lid against a portion of the flange 26 which is remote from the portion to be sealed and is adjacent the upper part of the side wall of the container 27. As the downward pressure continues, the flange 26 is pressed downwardly against the supporting member 28, which is preferably made of rubber or other suitable material so that it will yield under the pressure but at the same time will resist the pressure and tend to hold the flange 26 in place. The inner part of the heating surface 22, then comes into contact with the outer part of the lid or closure 25 and the flange 26 causing them to be fused together and to curl or shrink, as generally shown at 29 in FIGURE 5. This curling or shrinking may be much greater than that indicated in FIGURE 5. However, the combined heat insulating effect of the air space 20 and the heat insulating members 16 and 17, together with the pressure exerted by these last named members during the sealing operation prevents the curling or shrinking from extending inwardly to the body of the container.

As shown in FIGURES 1 and 4, the resilient supporting surface 28 is in turn supported by a generally rectangular member 30 and the latter is supported by four legs 31. The legs 31 are secured or bolted to the member 3 by screws 32, or in any other suitable manner.

The handle 33, preferably made of wood or some other suitable heat insulating material, is fastened to the upper part of the element 2 and is grasped by the user to cause the element 2 to pivot around the shaft or hinge 6. Washers or spacers 34 and 35 are provided to align the element 2 with respect to the supporting member 28.

The invention is not limited to any particular means for supplying heat to the element 2 but it is preferable to provided suitable internal heating coils or Calrod units similar to those used in a waffle iron. An electrical plug 34' connects a suitable source of electricity through the electrical cord 35' to a junction box 36 where the electricity is controlled by an on-off switch 37 and where a pilot light 38 is also provided to indicate when the apparatus is off or on. An electrical cord 39 connects one side of the switch 37 to the electrical heating elements within the housing of the member 2. The disposition and arrangement of these heating elements is not shown because it does not form a part of the present invention. It is only necessary to arrange the heating elements in such a way as to uniformly heat the member 11 in the area where the sealing operation is to take place. The elements 10 and 11 are preferably formed of steel or cast aluminum. The same is true of the element 30. The legs 31 are preferably formed from metal and may be integral with the base 3. They may also be formed separately from wood, plastic or any other suitable material.

As previously explained, the operation of the device is quite simple. The container body 27 which in the illustration shown is formed from a transparent plastic oriented polystyrene material is placed in the opening 40 of the supporting means 1 with the flanges 26 in contact with the upper part of the resilient supporting element 28. This element is preferably constructed of sponge rubber or similar material. The lid 25 is then placed over the container 27 with its outer edges contacting the flange 26. The user then grasps the handle 33 and pulls downwardly so that the element 2 is superimposed on the element 1. This brings about the sequence of operations previously described wherein the outer portion of the lid 25 is firmly held on one side by the surface 24 of the element 17 and pressed against the upper side of the flange 26, the latter in turn being pressed against the upper part of the resilient supporting member 28. As the downward pressure continues, the inner part of the heating surface 22 is brought into close proximity or into contact with the outer part of the lid 25 and the flange 26 causing the lid 25 and the flange 26 to be sealed together. As this sealing occurs, these materials also tend to shrink and fuse. However, the combined effect of the heat insulating means, including the air space 20 and the heat insulating elements 16 and 17, prevents transmission of heat to the inner part of the flange 26 and thereby avoids shrinking or otherwise adversely affecting the structure of the container 27.

This apparatus and method of operation fill a long felt want in the packaging container industry by providing a simple and economical apparatus and method for sealing lids or closures to container bodies made from materials which have heretofore been very difficult to seal without distorting the containers.

While the invention is especially applicable to heat sealing packaging containers formed from heat shrinkable plastic materials such as oriented polystyrene, it will be understood that it can also be used for other types of sealing operations where other materials are involved. It is also possible to use the invention where the closure or lid is made from one material and the body of the container is made from another. Thus, the closure or lid can be made from a different type of plastic from the body of the container or it can be made from paper coated with a heat sealing wax.

The invention is hereby claimed as follows:

1. A sealing device for sealing a peripherally continuous sealable lid means to the peripherally continuous free edge of a laterally extending heat shrinkable plastic flange means formed on the upper wall of a generally cup-shaped container body means comprising:
    (a) peripherally continuous supporting means surrounding an aperture for supporting said flange means when said cup-shaped body is disposed in said aperture,
    (b) a heating means having a peripherally continuous heating surface adapted to heat said lid means adjacent the free edge of said flange means when said lid means is brought into contact with said flange means,
    (c) peripherally continuous holding means operable to hold the portion of said flange means and lid means at a location remote from the heated portion thereof, in contact with said supporting means, and
    (d) heat insulation means including air gap means disposed radially inwardly of said heating surface, said holding means and heat insulation means being adapted to heat insulate and hold said portion of said flange means and lid means disposed radially inwardly of said heated portions thereof.

2. The sealing device claimed in claim 1 in which said supporting means comprises a peripherally continuous resilient support.

3. A sealing device as claimed in claim 1 in which said heating surface engages said lid means and is coated with a material of high lubricity which does not stick to said lid means in the heated state.

4. A sealing device as claimed in claim 1 in which said holding means comprises a substantially non-heat conducting member spaced laterally from the heating surface by a vertically extending air space.

5. A sealing device as claimed in claim 1 in which said holding means projects vertically below the heating surface and contacts said lid means before said heating surface when said heating surface and holding means are superimposed on a lid means applied to the flange means of a container body means supported by said supporting means.

6. A sealing device as claimed in claim 1 in which said heating element and said supporting means are cooperatively associated and are relatively pivotally mounted one with respect to the other.

7. A sealing device for sealing a peripherally continuous heat sealable lid to the peripherally continuous free edge of the laterally extending heat shrinkable plastic flange formed on the upper wall of a generally cup-shaped body comprising:
   (a) support means for said container comprising plate means having an aperture therein to receive the main body portion of said container, peripherally continuous resilient means surrounding disposed to the marginal edges of said aperture in said plate means for supporting said peripherally continuous flange on said container,
   (b) lid applying means pivotally mounted relative to said plate means, said lid applying means comprising body means, hold down means, and heating means,
   (c) said hold down means being mounted on said body means radially inwardly of said heating means and spaced therefrom by an air gap, and projecting vertically downwardly a greater dimension than said heating means when said body means is disposed in overlying relationship to said plate means, said hold down means being further characterized as being insulatingly mounted to said body means and said heating means,
   (d) whereby said insulatingly mounted hold down means engages and holds said lid on said flange which is in turn mounted on said resilient means during the application of said heating means thereto.

References Cited in the file of this patent
UNITED STATES PATENTS

| | | |
|---|---|---|
| 2,549,122 | Osterhof | Apr. 17, 1951 |
| 2,590,379 | Cloud | Mar. 25, 1952 |
| 2,641,094 | Starzyk | June 9, 1953 |
| 2,764,283 | Stanton | Sept. 25, 1956 |